United States Patent
Ungermann et al.

(10) Patent No.: US 7,474,625 B2
(45) Date of Patent: Jan. 6, 2009

(54) TIME-TRIGGERED COMMUNICATION SYSTEM AND METHOD FOR THE SYNCHRONIZED START OF A DUAL-CHANNEL NETWORK

(75) Inventors: Jörn Ungermann, Aachen (DE); Peter Fuhrmann, Aachen (DE)

(73) Assignee: NXP B.V., Eindhoven (NL)

( * ) Notice: Subject to any disclaimer, the term of this patent is extended or adjusted under 35 U.S.C. 154(b) by 414 days.

(21) Appl. No.: 10/557,638

(22) PCT Filed: May 10, 2004

(86) PCT No.: PCT/IB2004/050627

§ 371 (c)(1), (2), (4) Date: Nov. 17, 2005

(87) PCT Pub. No.: WO2004/105326

PCT Pub. Date: Dec. 2, 2004

(65) Prior Publication Data

US 2006/0233193 A1    Oct. 19, 2006

(30) Foreign Application Priority Data

May 20, 2003    (EP) .................................. 03101434

(51) Int. Cl.
*H04L 12/403* (2006.01)
(52) U.S. Cl. .................. 370/252; 370/228; 370/503
(58) Field of Classification Search ................. 370/252, 370/334, 464, 503, 228
See application file for complete search history.

(56) References Cited

U.S. PATENT DOCUMENTS

| | | | | |
|---|---|---|---|---|
| 4,497,059 A * | 1/1985 | Smith | ........................ | 714/797 |
| 4,774,709 A * | 9/1988 | Tulplue et al. | .................. | 714/4 |
| 6,467,003 B1 * | 10/2002 | Doerenberg et al. | ......... | 710/117 |
| 6,922,625 B2 * | 7/2005 | Weir et al. | ................... | 701/100 |
| 2003/0188222 A1 * | 10/2003 | Abbondanzio et al. | ......... | 714/12 |

\* cited by examiner

*Primary Examiner*—Ricky Ngo
*Assistant Examiner*—Ben H Liu

(57) ABSTRACT

A dual-channel network with in each case one communication controller (2, 6) for each of the two channels (A, B). In order to ensure that the two channels (A, B) operate on a temporally matched basis, an exchange of current states ("ready, "abort") takes place via an external or an on-chip interface (1*a*, 1*b*). The cold start operation is carried out only if, and so long as, both communication controllers are in the "ready" state.

19 Claims, 3 Drawing Sheets

Figure 1:
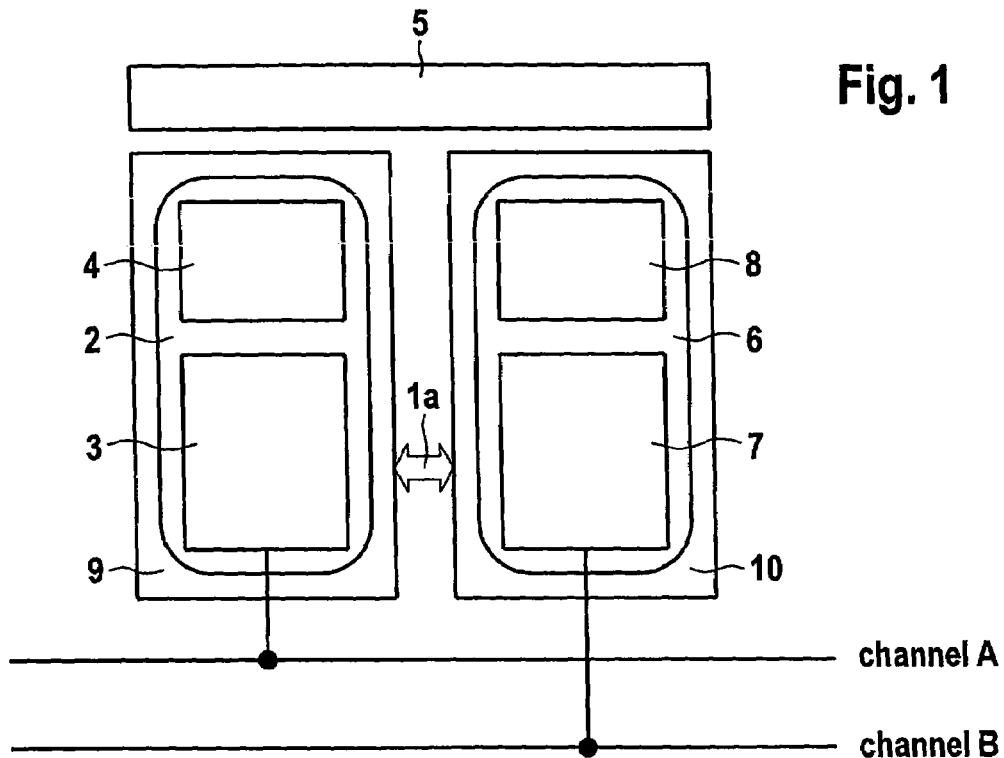

TIME-TRIGGERED COMMUNICATION SYSTEM AND METHOD FOR THE SYNCHRONIZED START OF A DUAL-CHANNEL NETWORK

The invention relates to networks or communication systems comprising two channels and at least two nodes. The invention relates in particular to time-triggered communication systems.

Conventional architectures, where a single communication controller (CC) controls two channels are error-prone to the extent that a single error in this communication controller or complete failure, thereof leads to faulty communication or deactivates the bus communication to both channels. Without additional error-reducing measures, a single faulty communication controller would be capable of precluding the communication on both channels by faulty transmission (so-termed Babbling Idiot).

In safety-relevant applications, data is transmitted in the dual-channel method to make sure, by means of redundancy, that the data sent twice arrives at least once at the recipient and is correctly processed there. As mentioned hereinabove, a single communication controller, which accesses two channels, cannot reach this degree of reliability as it might be subject to complete failure.

In a safety-relevant dual-channel network the same data is transferred on both channels and is checked for agreement by the host, consequently it is of decisive importance that the data communication should be synchronous. In this connection, the term "synchronous" is to be taken to mean that the data transmission on both channels is exactly simultaneous or time-shifted within a time window. As the communication controller falls back on the same clock generator for the data bus of each channel, the conformity in time is achieved.

A communication controller essentially comprises a controller-host interface, a protocol engine and a clock generator.

A typical fault-tolerant, time-triggered network consists of two channels to which communications nodes are connected. Each of these nodes consists of bus drivers, a communication controller, a host and finally, if necessary, a bus guardian device.

The bus driver transmits the bits and bytes, which are provided by the communication controller, to the connected channel, and provides the communication controller, in the proper order, with the information it receives on the channel. In a fault-tolerant network, the communication controller is connected with both channels, supplies relevant data to the host and receives data from the host, which it assembles, in the proper order, into frames and supplies to the bus driver.

Time-triggering or time control means that the time is sliced into periodic cycles. Each of these cycles consists of a plurality of segments. Each network node determines the start of a new cycle according to its own built-in clock generator. At least one segment is divided into a fixed number of slots. Each slot is allotted to exactly one communication controller, and only that communication controller has the right to transmit. Other segments of a cycle can be used for dynamic configuration or other purposes.

In a configuration set, the slots and the associated communication controllers are specified. An optional bus guardian with an independent set of configuration data enables the transmission on the bus only during these slots.

The host contains the data source and the data sink and generally does not take part in the activities of the bus protocol.

The communication system is started by a single node, the so-termed cold start node. This node is selected either by configuration or, if a plurality of nodes are available as cold start nodes, by the application of an algorithm, at the end of which a node remains. The communication controller of the selected cold start node must listen to both channels and transmit simultaneously all data for the cold start to both channels. Within a communication controller, only a single control logic for carrying out the cold start is available for both channels.

Each node listens to both channels. If a node receives a specific frame, which indicates the start of the communication, then it will take over the time schedule of the transmission observed and integrate it into its own system.

The system described here for starting a communication system corresponds, for example, to "TTP/C Specification", Version 0.5, Edition 0.1, 21 Jul. 1999, TT Tech Computertechnik AG; http://www.ttech.com; or to the "FlexRay Requirements Specification", Version 2.0.2, April 2002, FlexRay, Consortium; www.flexray.com.

It is an object of the invention to provide a time-triggered dual-channel network of the type described in the opening paragraph, which has been developed further in respect of fault-tolerance. It is also an object of the invention to provide a method enabling the synchronous cold start of a time-triggered dual-channel network of the type described in the opening paragraph.

This object is achieved in accordance with the invention by a time-triggered communication system having a single-channel architecture in which each of the two channels is driven, at one or more nodes of the time-controlled communication system of a dual-channel network, by a communication controller assigned to it. If two communication controllers operate in parallel at one node, i.e. in each case one communication controller is assigned to one of two channels, on which redundant information is transmitted which is compared by recipients, it is essential that the data are transmitted so as to be in temporal conformity, since it cannot be ensured that the two local clocks of the two communication controllers are synchronous. For this reason, in accordance with the invention, upon starting the transmission system, the state of one communication controller is transmitted to the other, so that one data bus is started, and if necessary stopped again, in dependence upon the other. In the communication system in accordance with the invention, the fault protection is increased, however, the single cold start node for both channels is replaced by two separate cold start nodes. The invention describes how both cold start nodes can come to an "agreement", during carrying out the cold start process, thereby ensuring that said cold start takes place substantially simultaneously on both channels.

Both communication controllers have differently configurable means for generating a start-up timer. The cold start node opens a start-up timer when it wants to perform a start operation. During this period of time it listens to the associated channel and to the intra-channel interface.

Preferably, both communication controllers comprise means for receiving a start signal or an abort signal. This signal is generated in dependence upon parameters and indicates how the node should behave.

In accordance with an embodiment of the invention both communication controllers are arranged on a common chip, and the interface is also integrated on this chip. This gives the advantage that only one housing must be mounted and electrically contacted.

In accordance with yet another embodiment both communication controllers are each arranged on a chip of their own and the interface is externally arranged. As a result, the fault domain "common chip" is omitted. In the case of, for example, an overvoltage fault possibly one of the two chips remains undamaged. As a result, the network would be functioning on one channel. In addition, failure of one of the two chips generally could not lead to failure of both channels due to the phenomenon known as "babbling idiot".

The object of the invention is also solved by virtue of the fact that each communication controller messages its status to the others, both cold start nodes may quasi come to an "agreement" on the start of the cold start operation.

A ready signal is generated as soon as all conditions for performing the cold start operation are appropriate for the cold start node in question, and an abort signal is generated as soon as a fault occurs at the cold start node in question. Such a fault might be, for example, noise on the channel or an indication that another node is performing, or has performed, a cold start operation.

In accordance with a preferred embodiment the states of the communication controllers are continuously compared or at least at time intervals that are sufficiently short. These time intervals should be determined by the maximum duration of the cold start and amount to only a fraction of this duration. In this manner it is ensured that changes of the parameters are taken into account.

The dual-channel network in accordance with the invention is preferably used in a motor vehicle control, where it is applied to control safety-relevant processes.

These and other aspects of the invention are apparent from and will be elucidated with reference to the embodiment(s) described hereinafter.

Figure 2:
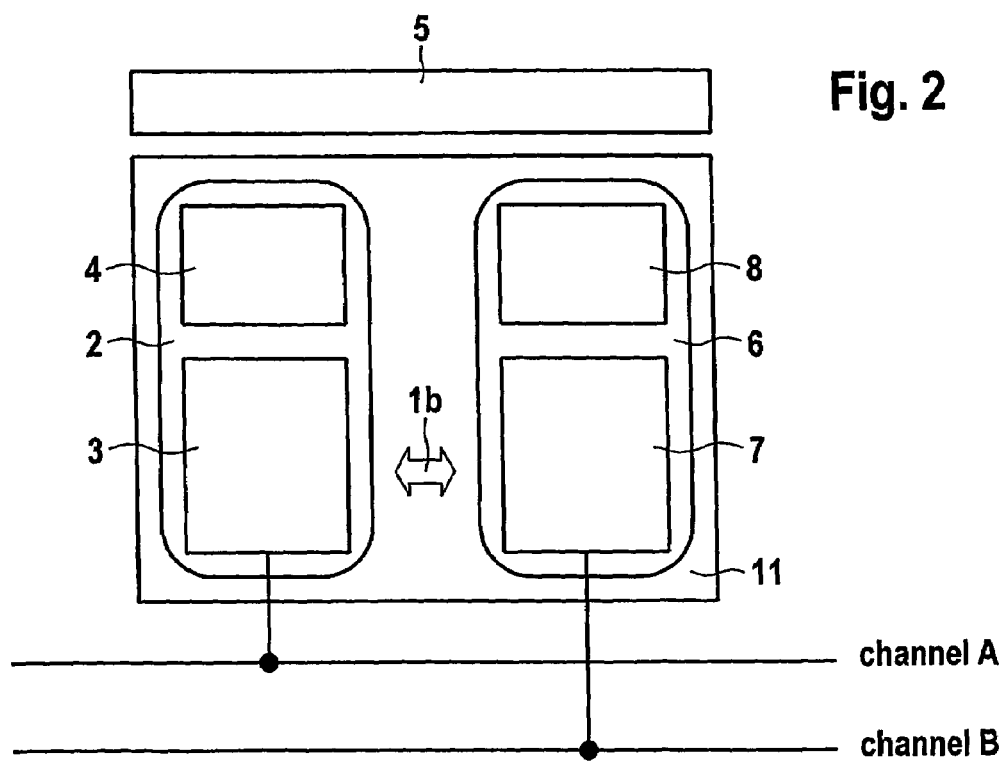
Figure 3:
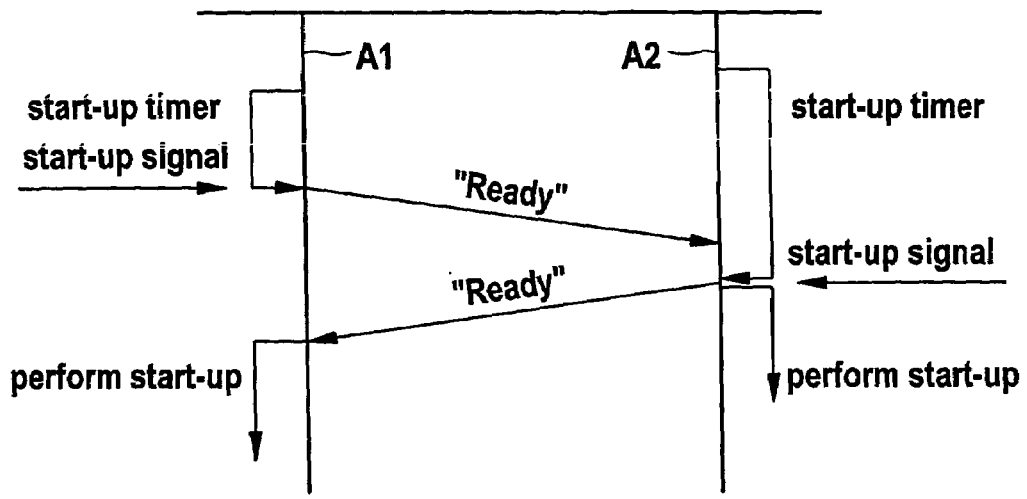
Figure 4:
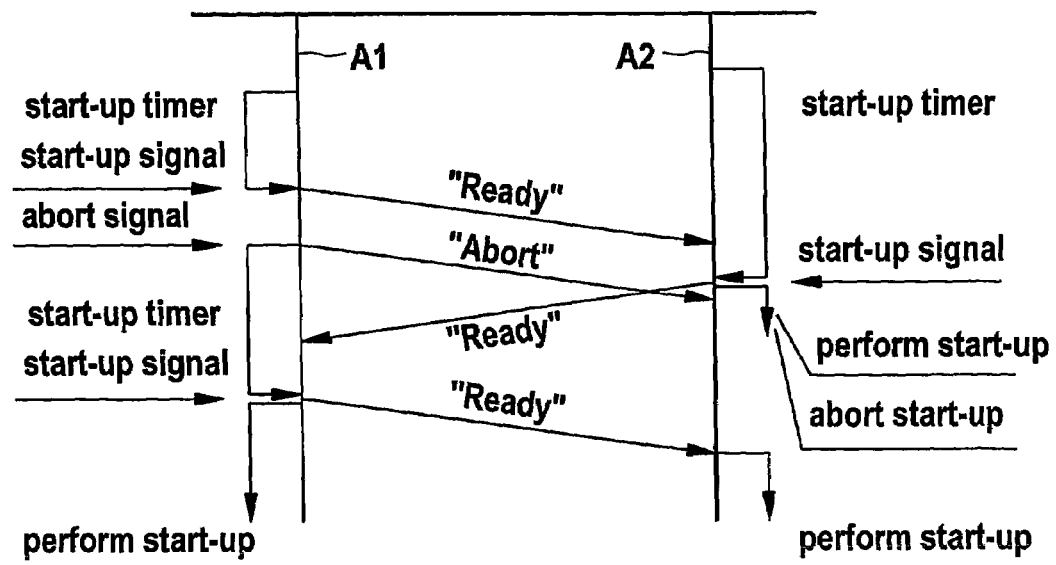
Figure 5:
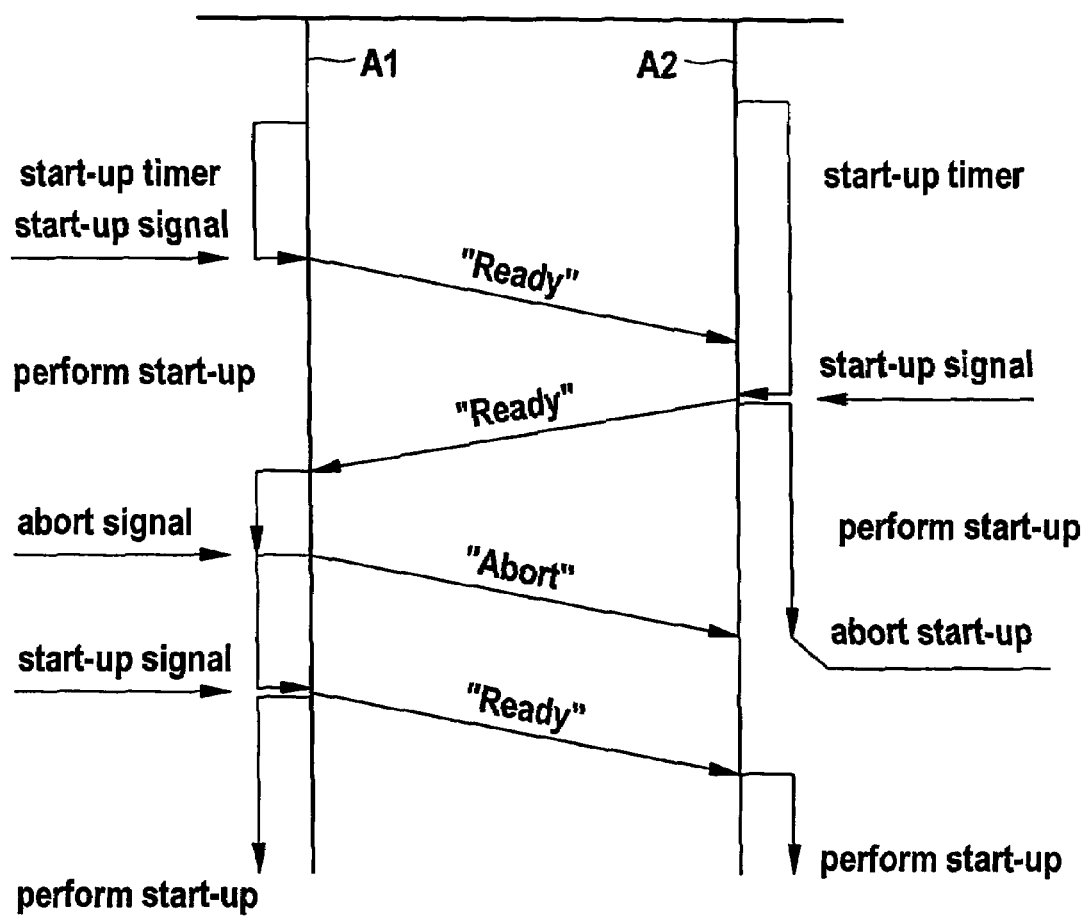

In the drawings:

FIG. 1 shows an example of a single-channel architecture with external interface, FIG. 2 shows an example of a single-channel architecture with an interface integrated on the chip, FIG. 3 shows a time diagram of a synchronized start in the case of a first combination of conditions, FIG. 4 shows a time diagram of a synchronized start in the case of a second combination of conditions, FIG. 5 shows a time diagram of a synchronized start in the case of a third combination of conditions.

FIG. 1 shows an example of a single-channel architecture with an external interface 1a. The first communication controller 2 comprises at least one protocol engine 3 and an interface 4 between the communication controller 2 and a host 5. The first communication controller 2 sends and receives on channel A of a dual-channel network, that is not shown in further detail.

The second communication controller 6 comprises at least one protocol engine 7 and an interface 8 between the communication controller 6 and a host 5. The second communication controller 6 sends and receives on channel B of a dual-channel network, that is not shown in further detail.

The first and the second communication controller 2, 6 are each arranged on a separate first and second chip 9, 10, respectively. Local inter-channel communication takes place via the external interface 1a. The example shown in FIG. 1 presents a complete doubling in comparison with a customary communication controller of dual-channel architecture. This example has the advantage that in the event of failure of one chip, it is very probable that the other chip is undamaged and hence at least one of the two communication controllers operates correctly.

FIG. 2 shows an example of a single-channel architecture, where an interface 1b is integrated on the chip. The first communication controller 2 comprises at least one protocol engine 3 and an interface 4 between the communication controller 2 and a host 5. The first communication controller 2 sends and receives on channel A of a dual-channel network, that is not shown in more detail.

The second communication controller 6 comprises at least one protocol engine 7 and an interface 8 between the communication controller 6 and a host 5. Said second communication controller 6 sends and receives on channel B of a dual-channel network, that is not shown in greater detail.

The first and the second communication controller 2, 6 are both arranged on a common chip 11. Local inter-channel communication takes place via the interface 1b integrated on this chip 11. The example shown in FIG. 2 presents a reduced duplication in comparison with a customary communication controller of dual-channel architecture. This example has the advantage that it requires only one housing to be mounted.

FIG. 3 shows a time diagram of a synchronized start operation in the case of a first combination of conditions. The left vertical axis A1 relates to the first communication controller 2, the right vertical axis A2 relates to the second communication controller 6. Both communication controllers 2, 6 comprise means for generating a start-up timer. The first combination of conditions relates to the case where the communication controllers, after both opening a start-up timer, yet at different points in time, receive a start signal. To make sure that both communication controllers carry out the start operation, elicited by the start signal, in a comparatively synchronous manner, the two channels are linked up. This is achieved as follows: each communication controller generates, upon receipt of the start signal, a status signal "ready" and sends this signal to the other communication controller and additionally checks whether a status signal "ready" has already been received from the other communication controller. Both communication controllers comprise suitable means for generating, sending, receiving and storing status signals. As soon as each of the communication controllers has the information about the "ready" status of the other communication controller, they both perform the start operation. The temporal offset essentially corresponds only to the time that goes by during the transmission of the "ready" status signal.

"Perform the start operation" means in this connection that both nodes are capable of carrying out a cold start, and a cold start of the network is carried out, for example, by sending synchronization frames (also referred to as sync frames). The "start signal" is a request by (or "to", see German text) the corresponding communication controller to perform a cold start of the communication system, for example in the TTP or flexray technique.

FIG. 4 shows a time diagram of a synchronized start of a second combination of conditions. The left vertical axis A1 relates to the first communication controller 2, the right vertical axis A2 relates to the second communication controller 6. Both communication controllers 2, 6 comprise means for generating a start-up timer. The second combination of conditions relates to the case where one of the communication controllers (in the Figure, the first) first receives a start signal and, after sending the "ready" status information, an abort signal. The other communication controller had already received, within its start-up timer, a start signal as well as the "ready" status signal and hence had started to carry out the start operation. The parameters are advantageously checked continuously or at least at time intervals. In this manner, also changes in status are processed. In the case of the combination of conditions shown here, the communication controller, which first received a start signal, receives at a later stage also an abort signal. Via the intra-channel interface the current "abort" status is messaged to the other communication controller. The continuous check of the conditions causes the changed status of the other communication controller to be taken into account, so that the communication controller, which has already initiated the start operation, causes this to be aborted. The start operation is restarted as soon as the two communication controllers are in the "ready" status again.

In this connection, "abort signal" means that the conditions for carrying out the start operation are not, or no longer, favorable. Such conditions are explained, for example, in the TIP or the flexray technique.

FIG. 5 shows a time diagram of a synchronized start in the case of a third combination of conditions. In this example, it must be ensured that failure of one channel causes also the other channel to stop, even if they have both embarked on the starting operation, thereby making sure that at a later stage they both start comparatively at the same time when they are both in the "ready" status. This enables a comparatively simultaneous operation. To make this possible both communication controllers continuously, or at least at specific time intervals, check the status of the relevant other communication controller.

By virtue of the time-triggered communication system described herein, the reliability of safety-relevant networks is increased.

The invention claimed is:

1. A time-triggered communication system which comprises:
   at least a first and second channel and at least a first and a second node, one of which is selected as a cold-start node to perform a cold-start operation of the communication system responsive to a start signal received via the channels;
   a first communication controller assigned to the first channel and connected the first node and a second communication controller assigned to the second channel and connected to the second node, the first and the second communication controller each including a local clock, said local clocks being independent of each other;
   the controller of the selected cold start node must listen to both channels and transmit simultaneously data for the cold staff to both channels, and wherein only a single control logic within a communication controller for carrying out the cold start is available for both channels;
   an interface for the interchannel communication is arranged between the first communication controller and the second communication controller, wherein the first and second communication controllers each generate and send a status signal to the other one of the communication controllers via the interface, each of the first and second communication controllers receiving and storing the status signal sent by the other one of the communication controllers, and
   the first and second communication controllers perform the cold-staff operation only if both of the communication controllers are in a ready status as indicated by the status signals.

2. A time-triggered communication system as claimed in claim 1, characterized in that each of the two local clocks is pulsed by another oscillator, wherein the first communication controller is assigned only to the first channel and the second communication controller is assigned only to the second channel.

3. A time-triggered communication system as claimed in claim 1, characterized in that both of the communication controllers generate a staff-up timer.

4. A time-triggered communication system as claimed in claim 1, wherein the status signals are one of a ready signal and an abort signal, and wherein the communication system is a dual-channel system that includes only the first and second channels, with identical data being transferred on both of the channels.

5. A time-triggered communication system as claimed in claim 1, characterized in that both of the communication controllers are arranged on a single chip, and the interface is also integrated on this chip.

6. A time-triggered communication system as claimed in claim 1, characterized in that both of the communication controllers are arranged on a chip of their own, and the interface is externally arranged to the chips.

7. A method of carrying out a synchronous cold start in a time-triggered communication system that includes at least a first and second channels and at least a first and second nodes, one of which is selected as a cold-start node to perform a cold start operation of the communication system responsive to a start signal received via the channels, the nodes each including a communication controller, wherein the controller of the selected cold start node must listen to both channels and transmit simultaneously data for the cold start to both channels, and wherein only a single control logic within a communication controller for carrying out the cold start is available for both channels, the method comprising the steps of generating a status signal in each of the communication controllers in dependence on parameters, transmitting each of the status signals to the other one of the communication controllers via an interface comparing, by each of the communication controllers, their own state with that of the other communication controller, and performing the cold-start operation only if, and so long as, both of the communication controllers are in a ready state as indicated by the status signals.

8. A method as claimed in claim 7, characterized in that a ready signal is generated as the status signal if all conditions for performing the cold start operation exist for the cold start node in question, and an abort signal is generated as the status signal if a fault occurs at the relevant cold start node.

9. A method as claimed in claim 7, characterized in that the states of the communication controllers are compared continuously or at least at time intervals, and wherein the communication controller of the first node is assigned only to the first channel and the communication controller of the second node is assigned only to the second channel.

10. The use of a time-triggered communication system as claimed in claim 1, in a motor vehicle control.

11. A device for a time-triggered communication system that includes at least a first and second channels and at least a first and second node, one of which is selected as a cold-start node to perform a cold start operation of the communication system responsive to a start signal received via the channels, the device comprising:
   a first communication controller with an independent local clock which is assigned to the first channel; a second communication controller with an independent local clock which is assigned to the second channel;
   wherein the controller of the selected cold start node must listen to both channels and transmit simultaneously data for the cold start to both channels, and wherein only a single control logic within a communication controller for carrying out the cold start is available for both channels
   an interface (1a, 1b) for the interchannel communication, arranged between the two communication controllers, wherein the first and second communication controllers each generate, and send a status signal to the other one of the communication controllers via the interface, each of the first and second communication controllers receiving and storing the status signal sent by the other one of the communication controllers, and wherein both the first and second communication controllers perform the cold-start operation only if both of the communication controllers are in a ready status as indicated by the status signals.

12. A device as claimed in claim 11, characterized in that each of the two independent local clocks is pulsed by oscillator, wherein the first communication controller is assigned only to the first channel and the second communication controller is assigned only to the second channel.

13. A device as claimed in claim 11, characterized in that its the two communication controllers each generate a start-up timer.

14. A device as claimed in claim 11, wherein the status signals are one of a ready signal or and an abort signal.

15. A device as claimed in claim 11, characterized in that it comprises a chip (11) on which both of the communication controllers (-27-are arranged on a chip and on which the interface (-tt9-) is integrated.

16. A device as claimed in claim 11, characterized in that each of the communication controllers is arranged on a chip of its own and the interface is arranged externally thereto.

17. A device as claimed in claim 11, characterized in that the device comprises: means for generating a status signal in each of the communication controller in dependence upon parameters; means for transmitting the status signals to the other one of the communication controller via an the interface; means for comparing the states of the two communication controllers, and means for carrying out a the cold- start operation.

18. A motor vehicle control comprising a device as claimed in claim 11.

19. A program storage medium comprising: a processor-readable storage device configured with instructions for carrying out a synchronous cold start in a time-triggered communication system that includes at least a first and second channel and at least a first and second node, one of which is selected as a cold-start node to perform a cold-start operation of the communication system responsive to a start signal received via the channels, the nodes each including a communication controller, wherein execution of the instructions by a processor causes the processor to perform operations including:

generating a status signal in each of the communication controllers in dependence on parameters;

transmitting each of the status signals to the other one of the communication controllers via an interface wherein the controller of the selected cold start node must listen to both channels and transmit simultaneously data for the cold start to both channels, and wherein only a single control logic within a communication controller for carrying out the cold start is available for both channels;

comparing, by each of the communication controllers, their own state with that of the other communication controller; and performing the cold-start operation only if, and so long as, both of the communication controllers are in a ready state as indicated by the status signals.

* * * * *